United States Patent [19]

Grosseau

[11] 3,963,087
[45] June 15, 1976

[54] PROTECTIVE SCREENS FOR EXHAUST SYSTEMS OF MOTOR VEHICLES

[75] Inventor: Albert Grosseau, Chaville, France

[73] Assignee: Societe Anonyme Automobiles Citroen, Paris, France

[22] Filed: Aug. 21, 1974

[21] Appl. No.: 499,294

[30] Foreign Application Priority Data
Aug. 22, 1973 France............................ 73.31001

[52] U.S. Cl.............................. 180/64 A; 60/299; 181/72
[51] Int. Cl.².......................................... B60K 13/04
[58] Field of Search........... 180/64 A; 181/72, 36 C, 181/43, 51, 52; 60/299, 320

[56] References Cited
UNITED STATES PATENTS

| 2,844,000 | 7/1958 | Nield, Jr. ........................... 181/36 C |
| 3,491,849 | 1/1970 | Newkirk .............................. 181/72 |
| 3,675,398 | 7/1972 | Giarrizzo ............................ 181/51 |
| 3,677,364 | 7/1972 | Pawlina.............................. 181/72 |
| 3,863,445 | 2/1975 | Heath ............................. 180/64 A |

Primary Examiner—M. H. Wood, Jr.
Assistant Examiner—David M. Mitchell
Attorney, Agent, or Firm—Brumbaugh, Graves, Donohue & Raymond

[57] ABSTRACT

A ground-protecting screen for an exhaust duct of a motor vehicle comprises a metallic grid carrying a metallic fabric. Preferably the fabric faces towards the duct.

7 Claims, 6 Drawing Figures

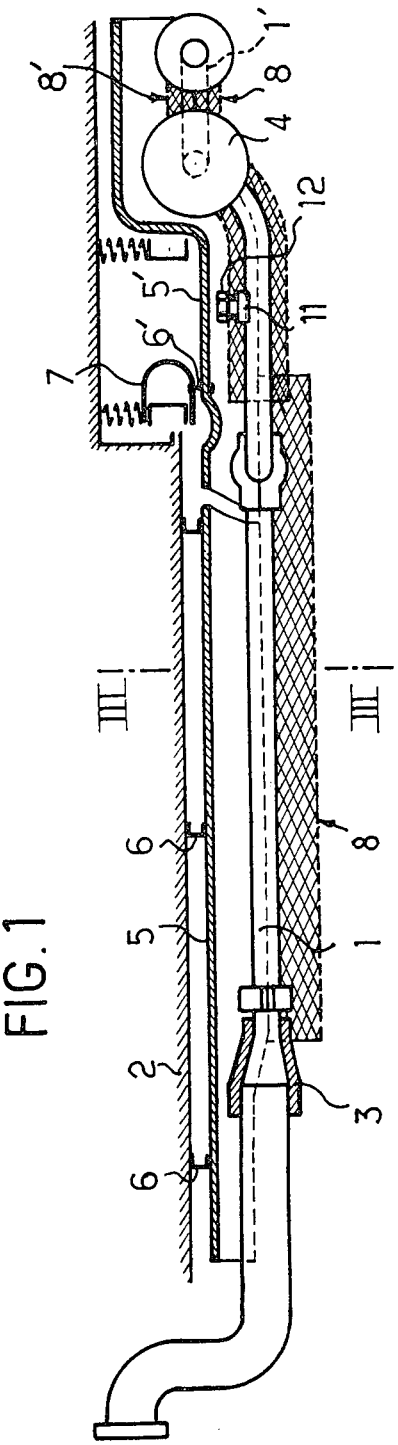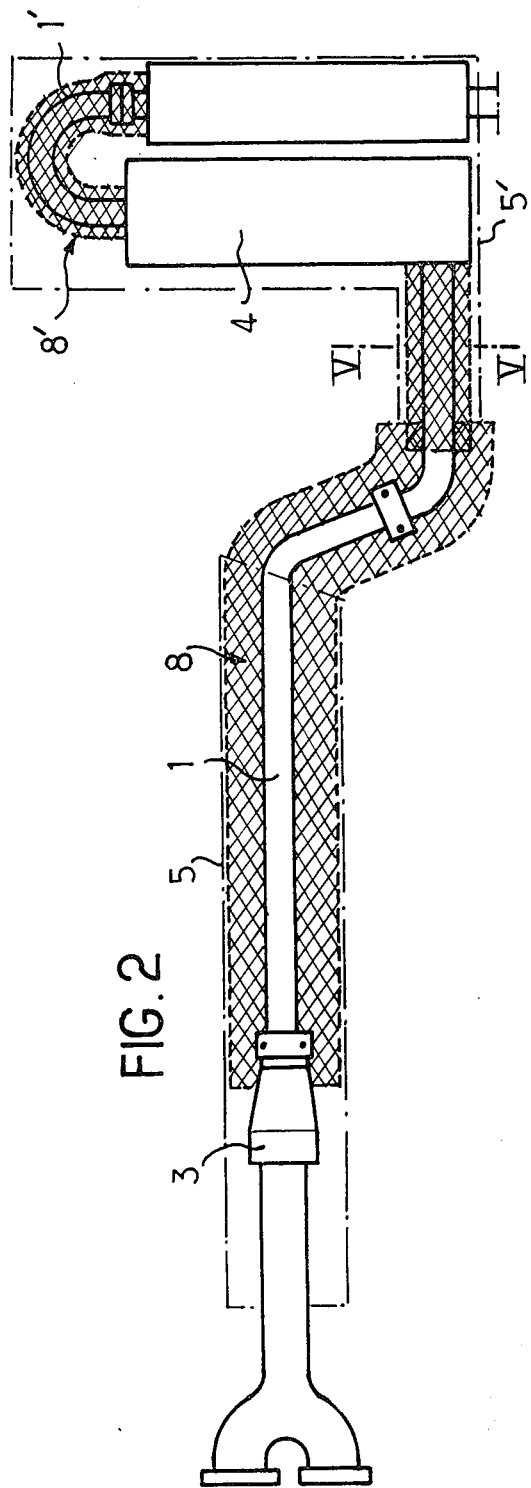

PROTECTIVE SCREENS FOR EXHAUST SYSTEMS OF MOTOR VEHICLES

BACKGROUND OF THE INVENTION

1. Field of the Invention.

The present invention relates to protective screens for exhaust systems for internal combustion engines.

2. Description of the Prior Art.

It sometimes happens that the gases passing through the exhaust duct of the internal combustion engine of a motor vehicle reach a very high temperature which can be of the order of 600°C. This is the case, in particular, of rotary engines at the exhaust of which a post-combustion device is provided to reduce the carbon monoxide content of the combustion gases whereby to prevent air pollution.

It has been proposed to protect the body of the vehicle by means of a refractory screen interposed between the body and the exhaust duct. If it is also desired to protect the ground, for example to prevent, if the vehicle is moving over grassy ground, the burning of the grass, this cannot be effected simply by interposing a refractory screen under the exhaust duct. Indeed, such a screen would then form with the body-protecting screen, a substantially closed sheath which would prevent the dissipation of heat by convection. Moreover, this screen would quickly be heated to a high temperature which, in turn, would cause the grass to burn.

SUMMARY OF THE INVENTION

According to the present invention, there is provided a ground protection screen for the exhaust duct of the internal combustion engine of a motor vehicle, said screen comprising a metallic grid, and a metallic fabric, said fabric being located on the grid.

Further according to the present invention, there is provided in a motor vehicle a body, an exhaust system, said system comprising an exhaust duct, and a protective screen arranged between the exhaust duct and the ground, said screen comprising a first layer in the form of a metallic grid, and a second layer in the form of a metallic fabric.

Preferably, the metallic fabric has a geometrical transparency of between 55 and 70%, advantageously about 60%, and a gap width of between 0.9 and 1 mm, and preferably the metal grid is composed of expanded metal.

The screen may extend around the entire periphery of the exhaust duct, passing between the duct and a protective screen for the body of the vehicle. When the protective screen for the body is of a refractory material disposed between two metal support elements, the ground-protection screen forms the upper support element of the protection screen for the body.

BRIEF DESCRIPTION OF THE DRAWINGS

Embodiments of the invention will now be described, by way of example only, with reference to the accompanying diagrammatic drawings, in which:

FIG. 1 is a vertical cross-section of an exhaust duct having a protective screen in accordance with the present invention;

FIG. 2 is a horizontal cross-section of the arrangement shown in FIG. 1;

DESCRIPTION OF THE PREFERRED EMBODIMENTS

Figure 5:
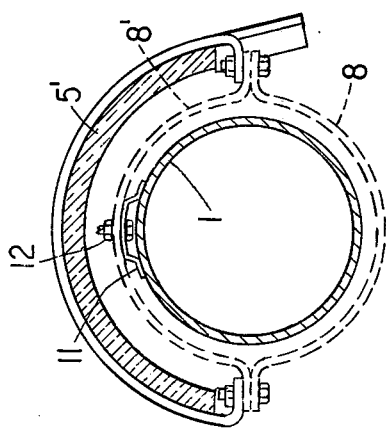
FIG. 5 is a section taken on line V—V of FIG. 2.

As shown in FIGS. 1 and 2, an exhaust duct 1 extends under the body 2 of a vehicle, from a connection 3 leading from, and suitably supported in a conventional manner by physical attachment to an engine (not shown) mounted on the body 2, to an exhaust chamber 4; the chamber 4 is formed of two independent elements which are joined together by a length of ducting 1'.

A protective screen 5 is disposed between the body 2 and the duct 1; this screen is made of an insulating material, for example alumina silicate, disposed between two aluminum support sheets. The screen 5 is inwardly curved and extends as far as a horizontal plane passing through the axis of the duct 1, the screen being fixed to the body by lugs 6. Behind the screen 5 is a screen 5' which covers the elements of the exhaust chamber 4 and which is fixed by lugs 6' to a rear axle frame 7 which is movable by a limited extent with respect to the body 2.

Figure 4:
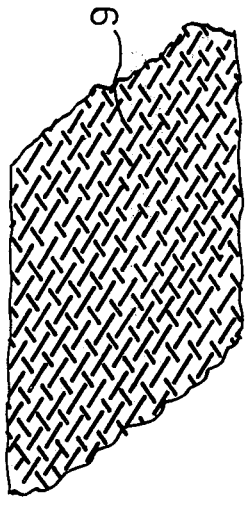
FIG. 4 is a perspective view of part of the screen, the component parts of the screen shown separately.

A curved screen 8 is located beneath the duct 1 so as to lie between the ground and the exhaust duct 1. As can be seen in FIG. 4, the screen 8 is in the form of a laminate comprising a layer 10 composed of a metallic grid to which is applied a layer 9 in the form of a metallic fabric 9, the fabric layer 9 facing towards the duct 1. In the embodiment shown the grid is made of expanded metal; the fabric 9 may, for example, be of No. 20 fabric which corresponds to seven meshes per centimeter, to a gap width of 0.9 to 1 mm, and to a geometrical transparency of 60%.

Figure 3:
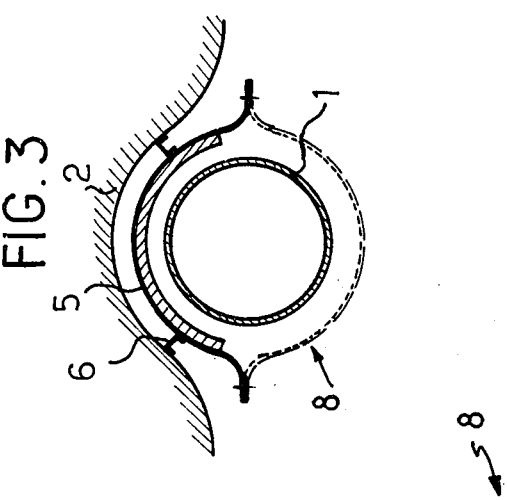
FIG. 3 is a section taken on line III—III of FIG. 1.

The screen 8 is fixed to the underside of the screen 5 as can be seen in FIG. 3, in any suitable conventional manner whereby contiguous flanges are held together by fastening means (not shown). Beneath the screen 5', in line with the portion of the duct which extends as far as the exhaust chamber 4, the screen 8 is fixed to a screen 8' which is of the same construction and is disposed between the duct 1 and the screen 5'. The screen 8' is itself fixed to the duct 1 by a welded strap 11 and a bolt 12 (FIG. 1).

In a similar manner the ducting 1' is surrounded by a screen 8 and a screen 8' and maintained in spaced-apart relation by suitable conventional means such as brackets or straps (not shown).

Figure 6:
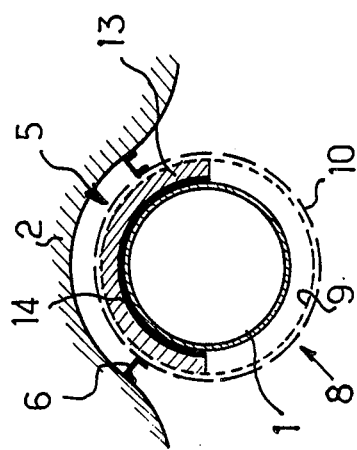
FIG. 6 is a section, similar to FIG. 3, of an alternative arrangement.

In the embodiment shown in FIG. 6, the screen 5 is formed by an insulating material 13 disposed between two support elements. The lower support element, which is in contact with the duct 1 is formed of sheet metal 14, for example, of aluminum; the upper support element is constituted by the screen 8 which extends around the entire periphery of the duct.

In the ground-protection screen particularly described, the metallic fabric constitutes a semi-permeable screen. It does not stop the dissipation of heat by convection, but slows it down, and controls radiation; finally, it prevents grass from coming in contact with the duct and cannot set it on fire, since the fabric is at a temperature considerably lower than that of the duct. For its part, the metallic grid which, alone, would be inefficient because of the wide section of its gaps, strengthens the metallic fabric whose own strength would not enable it to withstand the stresses to which the screen may be subjected.

What is claimed is:

1. A ground protection screen for the exhaust duct of the internal combustion engine of a motor vehicle mounted on and depending from the vehicle and interposed in substantially spaced-apart relation at least between a portion of the exhaust duct and ground, said screen comprising
   a metallic supporting grid permeable to air flow, and
   an open mesh metallic fabric, said fabric being located on the grid in overlying relation thereto.

2. In a motor vehicle having
   a vehicular body and
   an exhaust system depending at least in part therefrom including
   an exhaust duct for conducting high temperature gases and
   a first protective screen, means for mounting said first protective screen in depending relation from said body and positioned in substantially spaced-apart relation between at least a portion of the exhaust duct and the ground, said screen comprising
   a first layer in the form of a supporting metallic grid permeable to air flow, and
   a second layer in the form of an open mesh metallic fabric in overlying relation to said first layer.

3. A vehicle according to claim 2, wherein the second layer faces the duct.

4. A vehicle according to claim 2, wherein said fabric has a geometric transparency of between 55 and 70% and a gap width of between 0.9 and 1 mm.

5. A vehicle according to claim 2, wherein said first protective screen including said two layers extends around the entire periphery of the duct in a given location adjacent at least a portion of the longitudinal extent of the duct.

6. A vehicle according to claim 5, further comprising a second protective screen, means for mounting said second protective screen in depending relation from the body and in a position located between the duct and the body in substantially spaced-apart relation, the duct lying beneath the body, and a portion of the said first protective screen in said given location along the duct lying between the duct and said second screen.

7. A vehicle according to claim 5, further comprising a second protective screen, means for mounting said second screen in depending relation from the body and in a position located between the duct and the body, and said second screen being composed of a refractory material, and
   a portion of said first screen extending around the periphery of the duct and interposed between the body and the duct in said given location along the duct constituting an upper support element for said second screen.

* * * * *